(12) United States Patent
Syuto

(10) Patent No.: US 11,008,192 B2
(45) Date of Patent: May 18, 2021

(54) FIBER BUNDLE JOINING APPARATUS AND FIBER BUNDLE JOINING METHOD

(71) Applicant: TOYOTA JIDOSHA KABUSHIKI KAISHA, Toyota (JP)

(72) Inventor: Kazutoshi Syuto, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 140 days.

(21) Appl. No.: 16/135,635

(22) Filed: Sep. 19, 2018

(65) Prior Publication Data
US 2019/0135576 A1   May 9, 2019

(30) Foreign Application Priority Data

Nov. 9, 2017   (JP) .............................. JP2017-216570

(51) Int. Cl.
*B29C 65/20* (2006.01)
*B29C 65/78* (2006.01)
(Continued)

(52) U.S. Cl.
CPC ........... *B65H 69/061* (2013.01); *B29C 65/20* (2013.01); *B29C 65/7832* (2013.01);
(Continued)

(58) Field of Classification Search
CPC ......... B29C 65/08; B29C 65/18; B29C 65/20; B29C 65/7802; B29C 65/7832; B29C 66/1122; B29C 66/345; B29C 66/43; B29C 66/69; B29C 66/721; B29C 66/7212; B29C 66/72141; B29C 66/8362; B29C 66/853; B65H 67/02; B65H 69/02; B65H 69/06;
(Continued)

(56) References Cited

U.S. PATENT DOCUMENTS

| | | | |
|---|---|---|---|
| 7,632,372 B2 * | 12/2009 | Hoffmann | ........... B29C 53/8016 156/169 |
| 2007/0044896 A1 * | 3/2007 | Tingley | .................... B29C 66/69 156/157 |

(Continued)

FOREIGN PATENT DOCUMENTS

| | | |
|---|---|---|
| CN | 101579922 A | 11/2009 |
| CN | 106061720 A | 10/2016 |

(Continued)

*Primary Examiner* — Michael A Tolin
(74) *Attorney, Agent, or Firm* — Finnegan, Henderson, Farabow, Garrett & Dunner, LLP

(57) ABSTRACT

A fiber bundle joining apparatus includes: a support table configured to hold a terminal end portion side of a first fiber bundle; a roller mechanism having a roller around which a leading end portion side of a second fiber bundle is capable of being wound; a movement mechanism configured to perform a first movement for moving the roller mechanism to the vicinity of the terminal end portion side of the first fiber bundle, and a second movement for further moving the roller mechanism on the terminal end portion side of the first fiber bundle to create a state where the leading end portion side of the second fiber bundle is stacked on the terminal end portion side of the first fiber bundle; and a thermocompression bonding mechanism configured to pressure-bond the first fiber bundle and the second fiber bundle.

5 Claims, 8 Drawing Sheets

(51) Int. Cl.
  *B65H 69/06* (2006.01)
  *B65H 69/08* (2006.01)
  *B29C 65/00* (2006.01)
  *D01H 15/00* (2006.01)
  *D02J 1/04* (2006.01)
  *D02J 1/08* (2006.01)

(52) U.S. Cl.
  CPC .......... *B29C 66/1122* (2013.01); *B29C 66/43* (2013.01); *B29C 66/69* (2013.01); *B29C 66/8362* (2013.01); *B29C 66/853* (2013.01); *B65H 69/06* (2013.01); *B65H 69/08* (2013.01); *D01H 15/00* (2013.01); *D02J 1/04* (2013.01); *D02J 1/08* (2013.01); *B65H 2701/31* (2013.01); *B65H 2701/37* (2013.01); *B65H 2701/38* (2013.01)

(58) Field of Classification Search
  CPC .. B65H 69/08; B65H 69/085; B65H 2701/31; B65H 2701/312; B65H 2701/313; B65H 2701/314; B65H 2701/37; B65H 2701/38; B65H 69/061; D01H 15/00; D02J 1/04; D02J 1/08
  See application file for complete search history.

(56) References Cited

U.S. PATENT DOCUMENTS

| | | |
|---|---|---|
| 2009/0283504 A1 | 11/2009 | Matsuo et al. |
| 2014/0346270 A1 | 11/2014 | Tanigawa et al. |
| 2017/0050396 A1 | 2/2017 | Isono et al. |

FOREIGN PATENT DOCUMENTS

| | | |
|---|---|---|
| JP | 2011-131537 | 7/2011 |
| JP | 2013-063823 | 4/2013 |

* cited by examiner

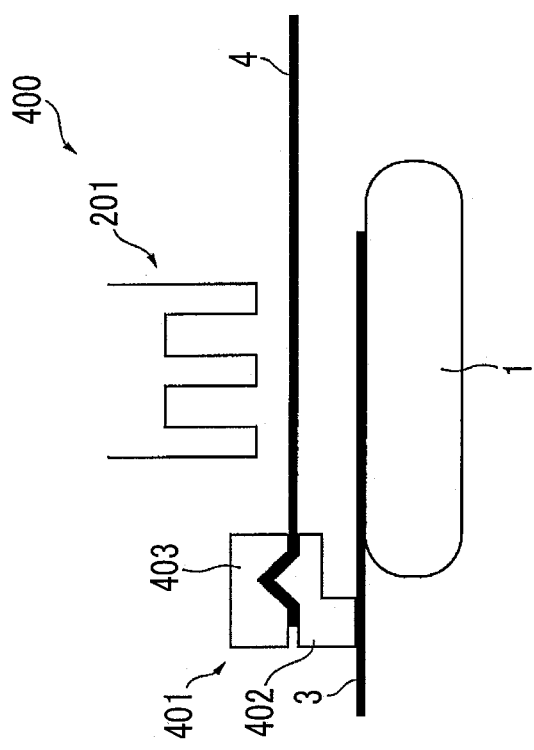
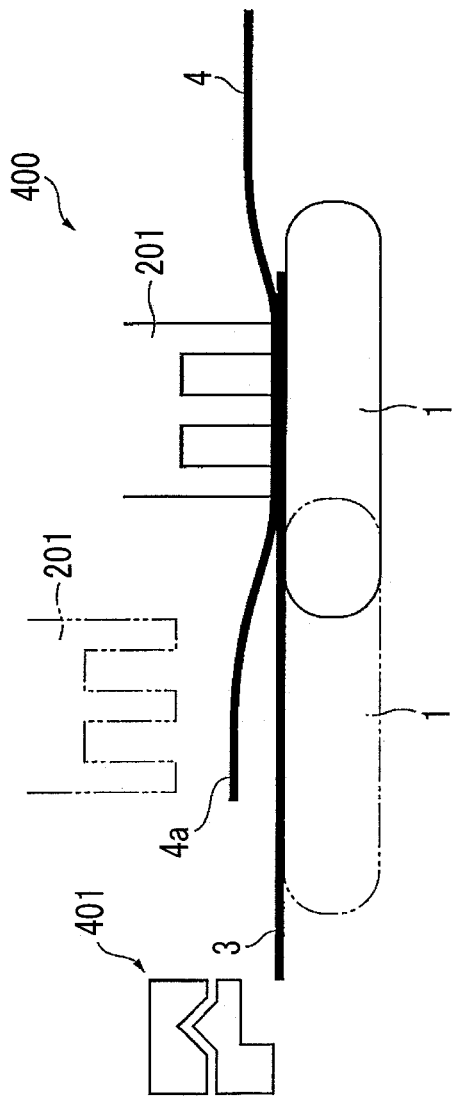

FIBER BUNDLE JOINING APPARATUS AND FIBER BUNDLE JOINING METHOD

INCORPORATION BY REFERENCE

The disclosure of Japanese Patent Application No. 2017-216570 filed on Nov. 9, 2017 including the specification, drawings and abstract is incorporated herein by reference in its entirety.

BACKGROUND

1. Technical Field

The disclosure relates to a fiber bundle joining apparatus and a fiber bundle joining method for joining a resin-impregnated first fiber bundle (hereinafter referred to as a "first fiber bundle") and a resin-impregnated second fiber bundle (hereinafter referred to as a "second fiber bundle").

2. Description of Related Art

A thermosetting resin-impregnated fiber bundle in which a fiber bundle such as a glass cloth or a carbon fiber bundle is impregnated with a thermosetting resin such as epoxy and is in a semi-cured state is used as a material for many structural members. Normally, a resin-impregnated fiber bundle is wound around the outer peripheral surface of a liner by a filament winding method, a tape winding method, or the like. Thereafter, appropriate heat curing treatment is performed. In the treatment described above, work of joining fiber bundles wound around a plurality of fiber bundle bobbins in a continuous state is needed. For example, as described in Japanese Unexamined Patent Application Publication No. 2013-063823 (JP 2013-063823 A), joining of a terminal end portion of a fiber bundle wound around a first fiber bundle bobbin and a leading end portion of a fiber bundle wound around a second fiber bundle bobbin by thermocompression bonding is generally performed.

As described in Japanese Unexamined Patent Application Publication No. 2011-131537 (JP 2011-131537 A), work is also performed in which a terminal end portion of a preceding fiber bundle and a leading end portion of a subsequent fiber bundle are overlapped on a plate surface, a thermoadhesive sheet is applied to the overlapped portion, thermocompression bonding is applied thereto, and thereafter, the joined fiber bundle is passed through a resin bath to be impregnated with resin.

SUMMARY

In the joining of fiber bundles, it is needed to accurately position a preceding fiber bundle and a subsequent fiber bundle to be joined to the preceding fiber bundle at the time of the joining. In each of the apparatuses described in JP 2013-063823 A and JP 2011-131537 A, a devisal has been taken. However, in a fiber bundle joining apparatus of the related art which is currently in practical use, a technique of positioning fiber bundles is not sufficient and further improvement is needed.

The disclosure provides a fiber bundle joining apparatus and a fiber bundle joining method, in which it is possible to perform joining of resin-impregnated fiber bundles in a more accurately positioned state.

A first aspect of the disclosure relates to a fiber bundle joining apparatus including: a support table configured to hold a terminal end portion side of a first fiber bundle impregnated with resin; a roller mechanism having a roller around which a leading end portion side of a second fiber bundle impregnated with resin is able to be wound; a movement mechanism configured to perform a first movement for moving the roller mechanism that is in a state where the leading end portion side of the second fiber bundle is wound around the roller, to the vicinity of the terminal end portion side of the first fiber bundle held on the support table, and a second movement for further moving the roller mechanism on the terminal end portion side of the first fiber bundle after the first movement to create a state where the leading end portion side of the second fiber bundle is stacked on the terminal end portion side of the first fiber bundle; and a thermocompression bonding mechanism configured to integrally pressure-bond the terminal end portion side of the first fiber bundle and the leading end portion side of the second fiber bundle stacked on the support table.

In the fiber bundle joining apparatus according to the first aspect of the disclosure, a state where the leading end portion side of the second fiber bundle is wound around the roller may be a state where the leading end portion side of the second fiber bundle is wound around the roller more than an amount corresponding to one turn around the roller.

In the fiber bundle joining apparatus according to the first aspect of the disclosure, the roller mechanism may include a rotation restriction mechanism configured to restrict rotation of the roller. The movement mechanism may perform the first movement in a state where the rotation is restricted by the rotation restriction mechanism, and may perform the second movement in a state where the restriction by the rotation restriction mechanism is released.

In the fiber bundle joining apparatus according to the first aspect of the disclosure, the rotation restriction mechanism may be a stopper piece. The roller may have a cutout. The rotation of the roller may be restricted by contact of the stopper piece with an end wall configuring the cutout.

In the fiber bundle joining apparatus according to the first aspect of the disclosure, the roller mechanism may include arms and a coil spring. The roller may be mounted on the arms. The arms may be biased by a force of the coil spring so as to rotate with one point of the arms as a center axis.

A second aspect of the disclosure relates to a fiber bundle joining method including: holding a terminal end portion side of a first fiber bundle on a support table, the first fiber bundle being impregnated with resin; winding a leading end portion side of a second fiber bundle around a roller more than an amount corresponding to one turn, the second fiber bundle being impregnated with resin; holding the roller around which the leading end portion side of the second fiber bundle is wound on the terminal end portion side of the first fiber bundle held on the support table; moving the roller in a direction in which the leading end portion side of the wound second fiber bundle is unwound, in a state where the roller is placed on the terminal end portion side of the first fiber bundle; and integrally joining the terminal end portion side of the first fiber bundle and the leading end portion side of the second fiber bundle that are stacked.

According to the aspects of the disclosure, it becomes possible to join a terminal end portion of a preceding first fiber bundle and a leading end portion of a subsequent second fiber bundle in an accurately positioned state.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 9A is a diagram for describing another example of the fiber bundle joining apparatus and the fiber bundle joining method; and FIG. 9B is a diagram for describing another example of the fiber bundle joining apparatus and the fiber bundle joining method.

DETAILED DESCRIPTION OF EMBODIMENTS

Figure 1:
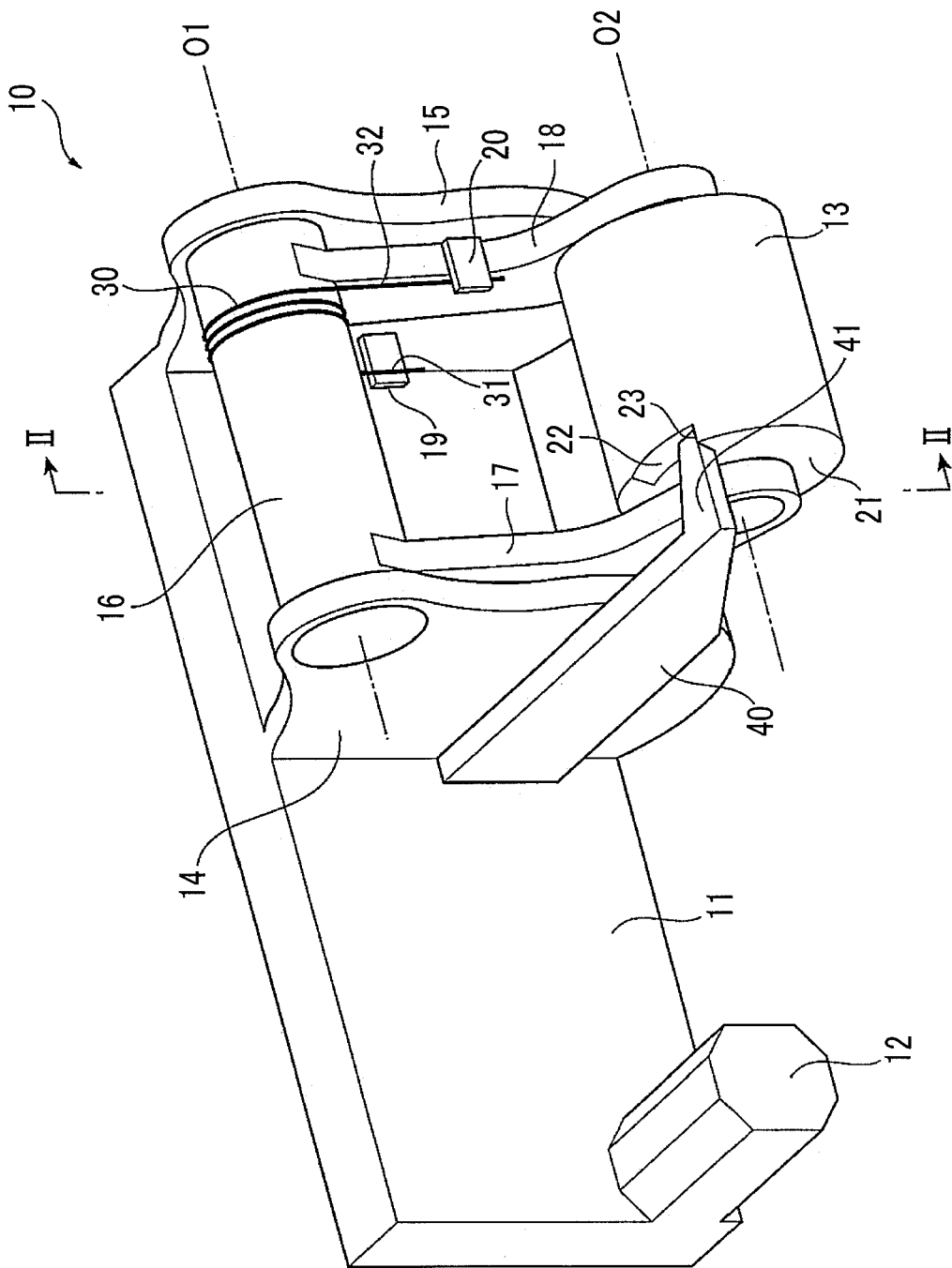
FIG. 1 is a perspective view for describing a roller mechanism that is a main part of a fiber bundle joining apparatus.

Hereinafter, an embodiment of the disclosure will be described with reference to the drawings. Before the embodiment is described, another fiber bundle joining apparatus 400 will be described with reference to FIG. 9A and FIG. 9B. The fiber bundle joining apparatus 400 is provided with a fiber bundle gripping mechanism 401 using a clamp. The fiber bundle joining apparatus 400 is made to move from a first position (not shown), that is, a position where the leading end portion side of a second fiber bundle 4 that is a subsequent fiber bundle is clipped, to a second position shown in FIG. 9A, that is, a position where the terminal end portion side of a first fiber bundle 3 that is a preceding fiber bundle is held on a support table 1, while a position is controlled by a guide mechanism (not shown). By the above, it becomes possible to position the leading end portion side of the second fiber bundle 4 with respect to the terminal end portion side of the first fiber bundle 3 with considerably high precision.

In the fiber bundle joining apparatus 400, the fiber bundle gripping mechanism 401 is provided with a lower clip piece 402 and an upper clip piece 403. The movement described above is performed in a state where the leading end portion side of the second fiber bundle 4 is clipped between the lower clip piece 402 and the upper clip piece 403. However, the second fiber bundle 4 is usually impregnated with epoxy resin for curing and is easy to slide. Therefore, it is needed to strengthen a gripping force by forming irregularities in the lower clip piece 402 and the upper clip piece 403. After the fiber bundle gripping mechanism 401 is moved to the position shown in FIG. 9A, a thermocompression bonding iron 201 is pushed toward the support table 1 to perform the contact and pressure-bonding of the two fiber bundles 3, 4. Thereafter, the clip force is released to separate the fiber bundle gripping mechanism 401. However, as shown in FIG. 9B, there is a case where a leading end area 4a of the second fiber bundle 4 clipped is needed to be thermocompression-bonded again by moving the thermocompression bonding iron 201 and the support table 1. Further, due to the existence of the lower clip piece 402, the leading end area 4a cannot help being in a state of floating from the first fiber bundle 3 on the support table 1 by an amount corresponding to the thickness of the lower clip piece 402. Therefore, it is difficult to avoid occurrence of variation in position in both a length direction and a right-left direction.

Figure 4:
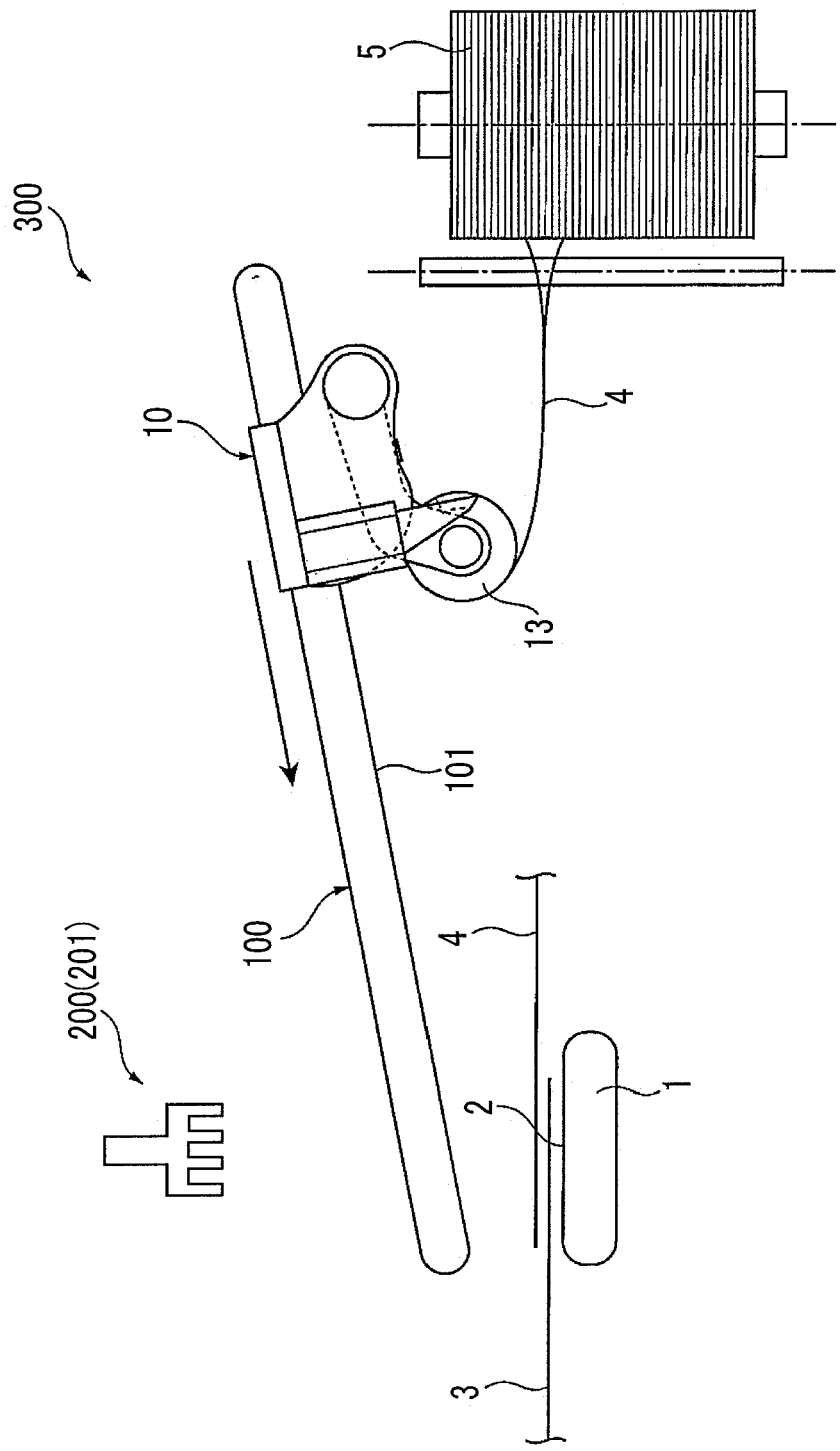
FIG. 4 is a top view showing the whole of the fiber bundle joining apparatus.

A fiber bundle joining apparatus 300 of the embodiment further improves the fiber bundle joining apparatus 400 shown in FIG. 9A and FIG. 9B. The fiber bundle joining apparatus 300 of the embodiment basically includes a support table 1, a fiber holding roller mechanism (hereinafter referred to as a "roller mechanism") 10, a fiber bundle holding roller mechanism movement mechanism (hereinafter referred to as a "movement mechanism") 100, and a thermocompression bonding mechanism 200, as shown in FIG. 4. Hereinafter, the constituent elements will be described in order.

The support table 1 is a support table for holding a thermosetting resin-impregnated fiber bundle, which is an object to be joined, at the time of joining, and has a flat holding surface 2. At the time of the joining of the fiber bundles, the terminal end portion side of the first fiber bundle 3, which is a preceding fiber bundle, is held on the holding surface 2. Then, as will be described later, the leading end portion side of the second fiber bundle 4, which is a subsequent fiber bundle, is stacked on the terminal end portion side of the first fiber bundle 3 held on the holding surface 2, and both the fiber bundles are integrally joined by thermocompression bonding.

Figure 2:
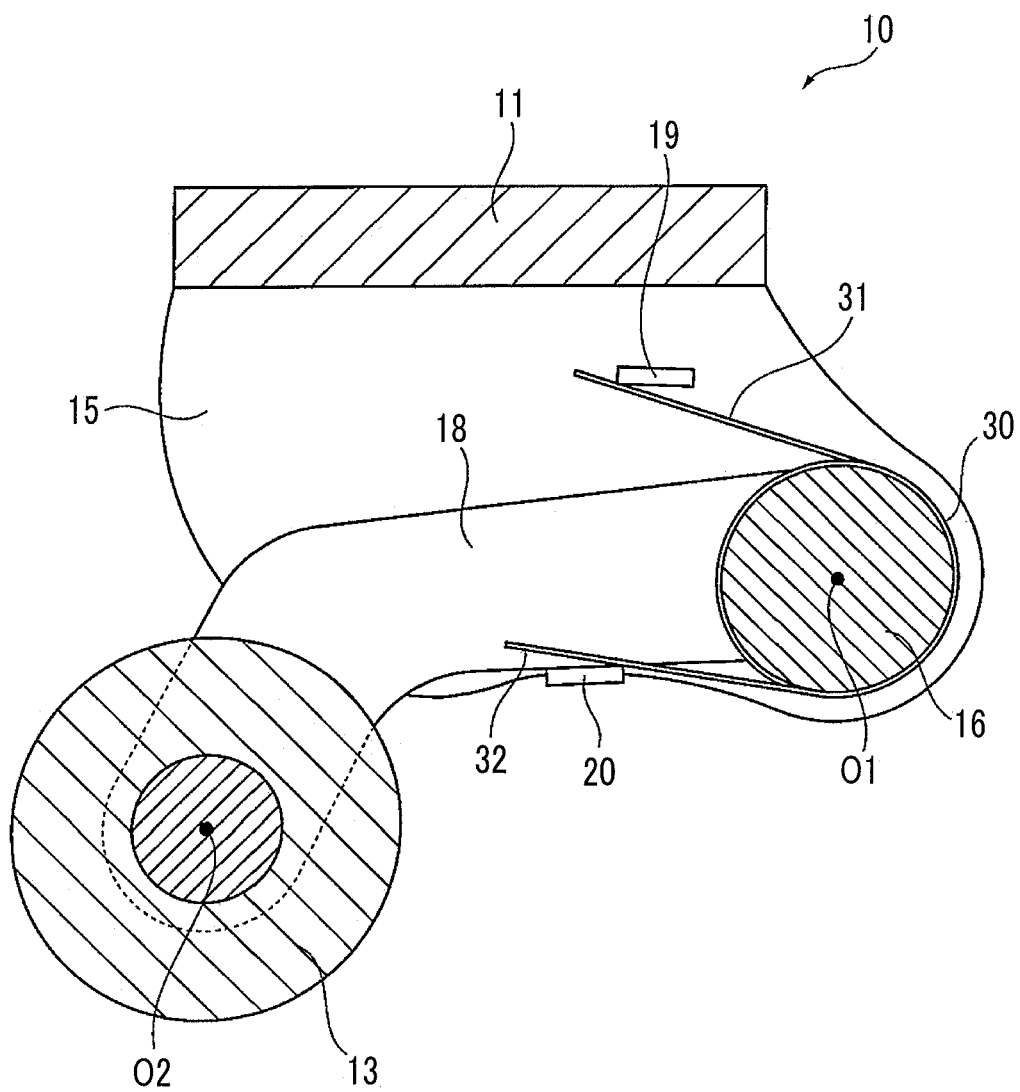
FIG. 2 is a cross-sectional view taken along line II-II of FIG. 1.
Figure 3:
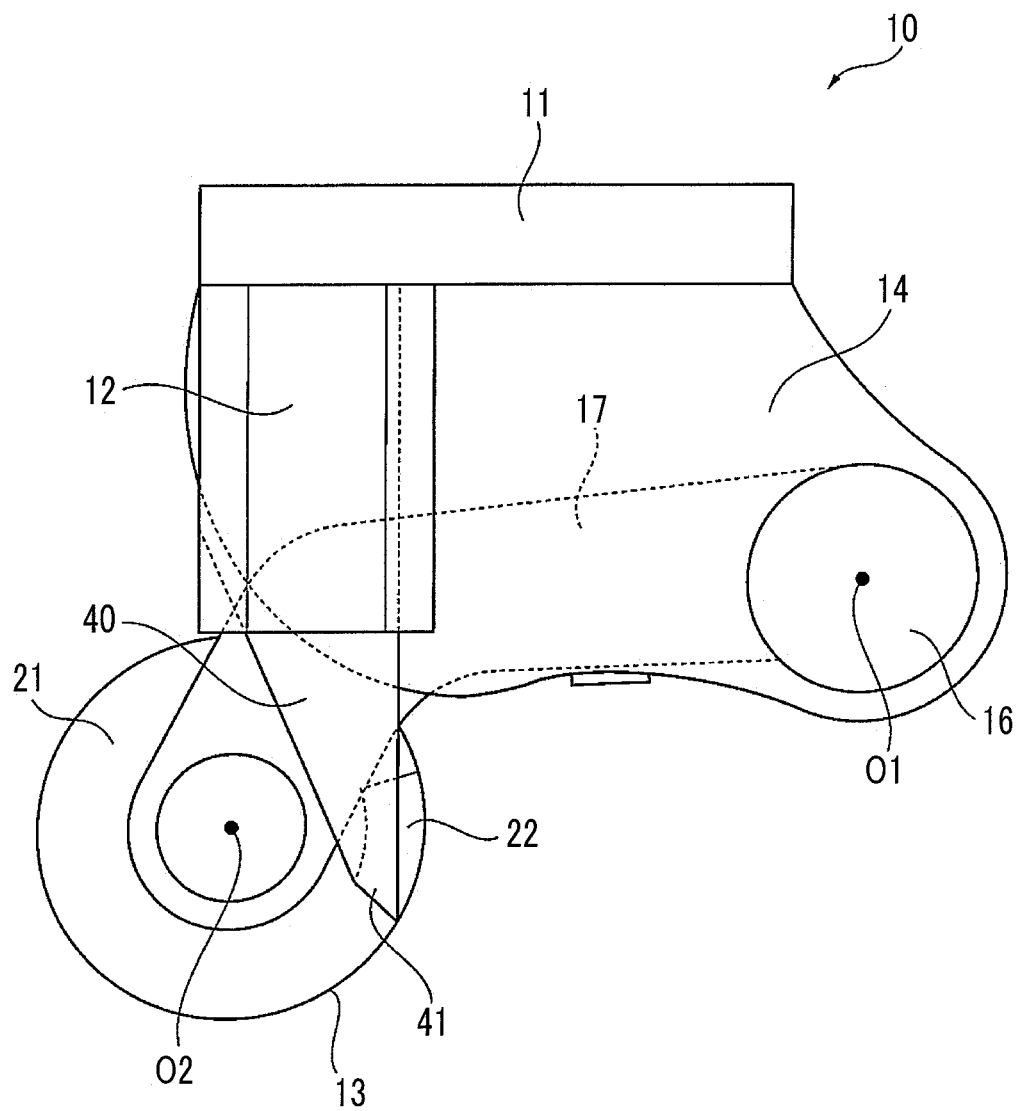
FIG. 3 is a side view of the roller mechanism of FIG. 1.

The roller mechanism 10 will be described with reference to FIG. 1 to FIG. 3. FIG. 1 is a perspective view for describing the roller mechanism 10 as a whole. FIG. 2 is a cross-sectional view taken along line of FIG. 1. FIG. 3 is a side view of the roller mechanism of FIG. 1.

The roller mechanism 10 has a base 11, and a support rod 12 is provided to be erect at an end portion on one side of the base 11. A fiber bundle holding roller (hereinafter referred to as a "roller") 13 is rotatably and swingably mounted on the side of the base 11 opposite to the support rod 12. That is, on the base 11, a pair of mutually parallel side walls 14, 15 stands up in the same direction as the support rod 12 at a predetermined interval. A support shaft 16 having a rotation center axis O1 is rotatably supported on one end side of each of the side walls 14, 15.

A pair of arms 17, 18 is fixed to the support shaft 16 so as to extend along the side walls 14, 15. The roller 13 having a rotation center axis O2 is rotatably supported on the leading end portions of the arms 17, 18. Therefore, a force in a direction intersecting the rotation center axis O2 is applied to the roller 13. As a result, the roller 13 can swing with the rotation center axis O1 of the support shaft 16 as a support axis. A coil spring 30 is wound around the support shaft 16. A first end 31 of the coil spring 30 is locked to a locking body 19 provided to be erect at the side wall 15 on one side. A second end 32 of the coil spring 30 is locked to a locking body 20 provided to be erect at the arm 18.

A cutout 22 is formed on a side surface 21 on the side facing the arm 17 on one side, of the roller 13. The cutout 22 has an end wall 23 extending in the direction of the rotation center axis O2. A stopper piece 40 is mounted on the side wall 14, that is, the side wall 14 on the side facing the side surface 21 on one side of the roller 13. A tip portion 41 of the stopper piece 40 is bent in a direction parallel to the rotation center axis O2 of the roller 13. The tip portion 41 is in contact with the end wall 23 in the cutout 22 formed in the roller 13. The stopper piece 40 configures a rotation restriction mechanism that restricts the rotation of the roller 13.

As shown in FIG. 2, the roller 13 always receives a biasing force rotating it in a counterclockwise direction around the rotation center axis O1 of the support shaft 16 by the force of the coil spring 30. However, as shown in FIG. 3, the tip portion 41 of the stopper piece 40 enters the cutout 22 of the roller 13, so that at the normal time, the roller 13 is in a state where it is stopped at a position restricted by the stopper piece 40. At the same time, the rotation of the roller 13 around the rotation center axis O2 is also restricted.

As shown in FIG. 4, in the fiber bundle joining apparatus 300 of the embodiment, the roller mechanism 10 is assembled to the movement mechanism 100. The support rod 12 provided to be erect at the base 11 of the roller mechanism 10 is gripped by a clamp (not shown) of the movement mechanism 100. The clamp reciprocates by an appropriate drive mechanism provided in the movement mechanism 100. Therefore, the roller mechanism 10 reciprocates along a guide rail 101 of the movement mechanism 100.

The guide rail 101 is inclined, in which an upper portion in the inclination in the drawing is at a position close to a fiber bundle bobbin 5, and a lower portion in the inclination is at a position close to the support table 1. As will be described later, at the time of the joining of fiber bundles, the roller mechanism 10 moves downward in the drawing along the guide rail 101 from a first position, which is an upper position shown in FIG. 4, passes the support table 1, and further moves to a second position, which is a downstream position. A thermocompression bonding iron 201 configuring the thermocompression bonding mechanism 200 is located above the support table 1, and the thermocompression bonding iron 201 and the support table 1 configure the thermocompression bonding mechanism 200.

A procedure of thermocompression bonding the terminal end portion side of the first fiber bundle 3 and the leading end portion side of the second fiber bundle 4 by using the fiber bundle joining apparatus 300 of the embodiment will be described. A fiber bundle that is unwound from a preceding fiber bundle bobbin (not shown) passes over the support table 1. When the fiber bundle of the fiber bundle bobbin is reduced, replacement of the fiber bundle bobbin is performed. At that time, the fiber bundle is cut by a cutter (not shown) in a state where the fiber bundle is placed on the support table 1, and the remaining fiber bundle is returned to the fiber bundle bobbin. In FIG. 4, reference numeral 3 denotes the terminal end portion side of the fiber bundle (the first fiber bundle) cut as described above.

After the above, or in parallel with the cutting operation or the like, a new fiber bundle bobbin is prepared. Reference numeral 5 in FIG. 4 denotes a newly prepared fiber bundle bobbin. On the other hand, the roller mechanism 10 is set at the first position shown in FIG. 4. In the state described above, the roller 13 is manually pushed upward in the drawing. By the push-up described above, the arms 17, 18 swing in a clockwise direction with the rotation center axis O1 of the support shaft 16 as a supporting point, and thus the roller 13 is lifted in the clockwise direction. Due to the movement described above, the engagement state between the tip portion 41 of the stopper piece 40 and the cutout 22 formed in the roller 13 is released. Therefore, the roller 13 can rotate around the rotation center axis O2.

In the state described above, the leading end portion side of the fiber bundle (the second fiber bundle 4) wound around the newly prepared fiber bundle bobbin 5 is pulled out and wound around the roller 13. Although there is no limitation on the amount of winding, the amount of winding more than one turn, more preferably, winding in an amount of about 1 and ¼ turns is performed. Since an overlapping portion corresponding to ¼ turn is formed on the roller 13, it is possible to make the stability of the winding state at the time of subsequent movement of the roller mechanism 10 more reliable.

Figure 5:
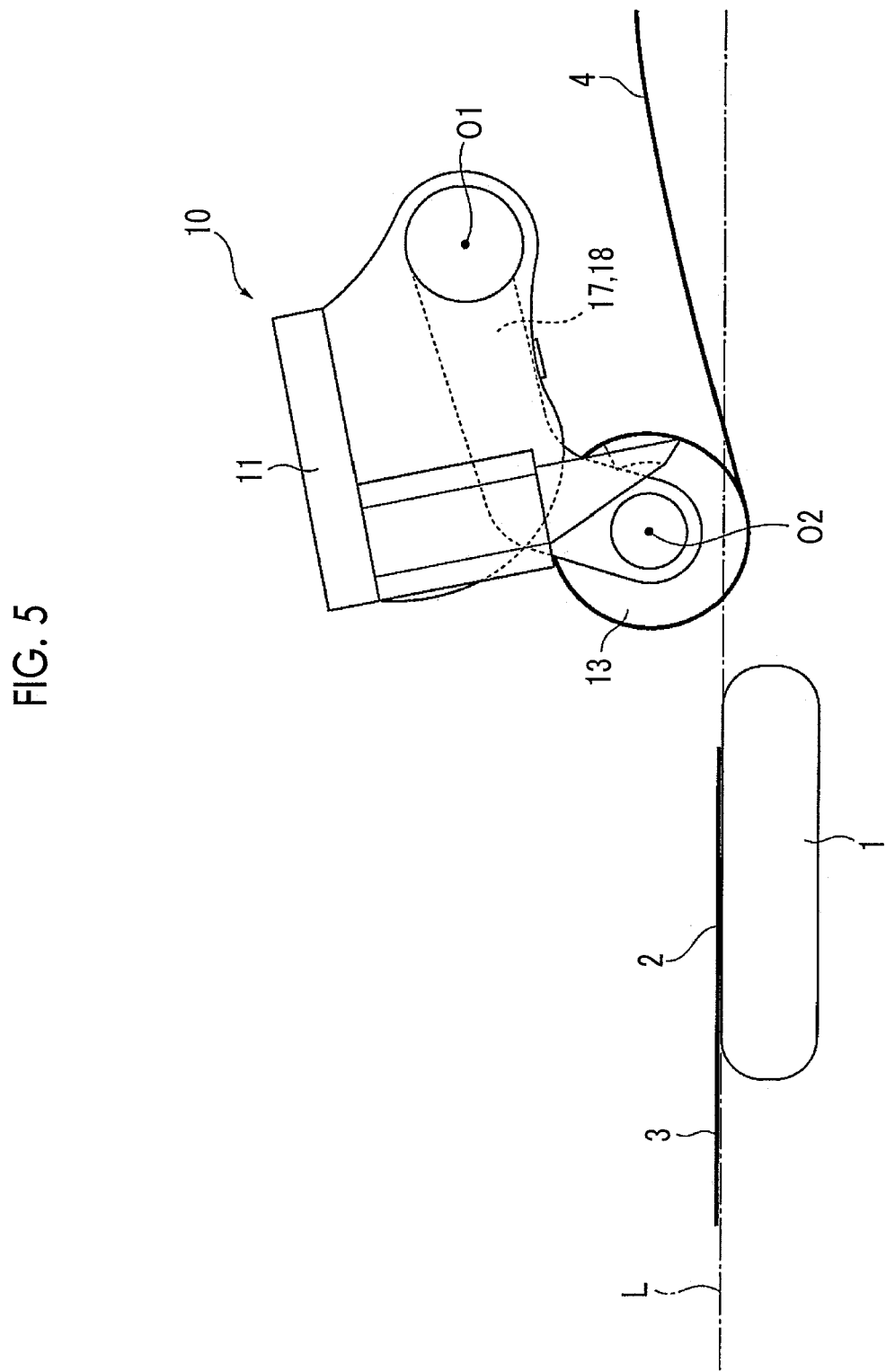
FIG. 5 is a diagram showing a state where the roller mechanism approaches a support table.

The roller mechanism 10 that is in a state where the leading end portion side of the second fiber bundle 4 is wound around the roller 13 is moved toward the support table 1 by operating the movement mechanism 100. FIG. 5 shows a state where the roller mechanism 10 approaches the support table 1 and the roller mechanism 10 and the support table 1 are in a state immediately before they come into contact with each other. At this position, as shown in the drawing, the roller mechanism 10 is positioned in the up-down direction such that the lowermost portion of the roller 13 is at a position slightly lower than a level L of the holding surface 2 of the support table 1. The movement so far is an example of a "first movement of the movement mechanism".

Figure 6:
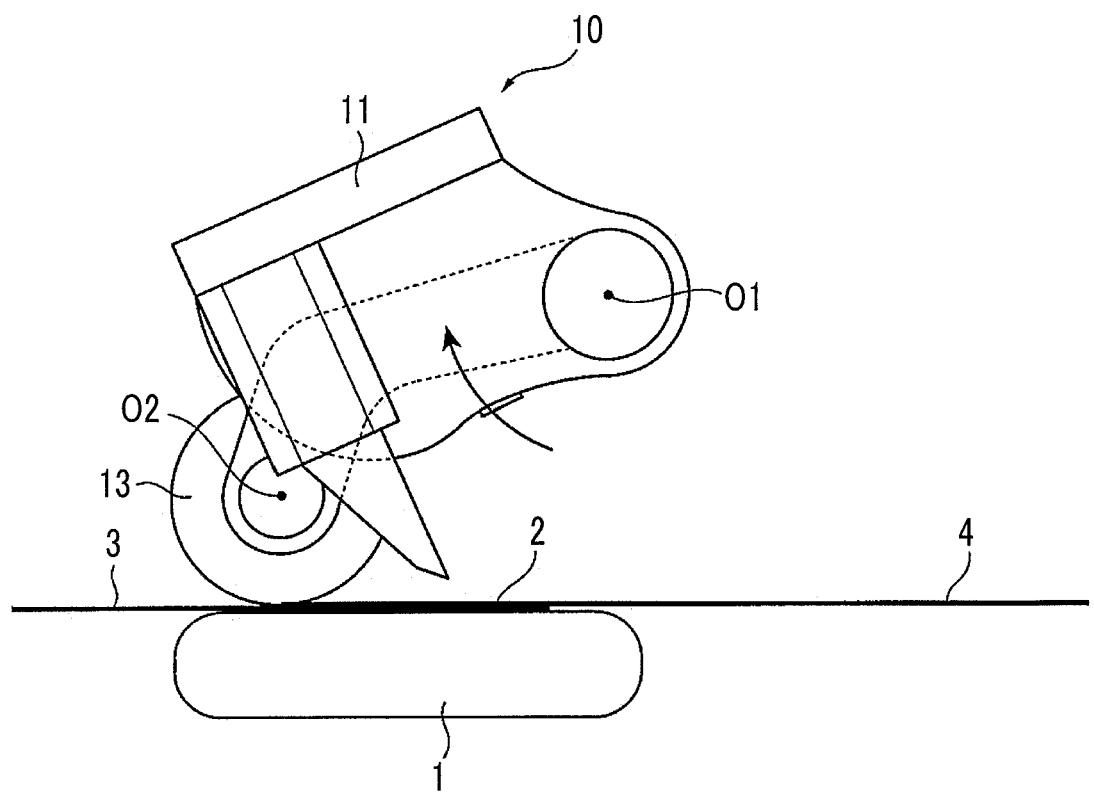
FIG. 6 is a diagram showing a state after a roller has come into contact with the support table.

When the roller mechanism 10 further moves leftward in the drawing by the movement mechanism 100, the roller 13 comes into contact with the end portion of the support table 1. Due to the contact, the roller 13 is displaced upward, and as a result, the arms 17, 18 swing in the clockwise direction with the rotation center axis O1 of the support shaft 16 as a supporting point. Due to the swing, the engagement state between the tip portion 41 of the stopper piece 40 and the cutout 22 formed in the roller 13 is released. Therefore, the roller 13 can freely rotate. The engagement is released, so that the biasing force of the coil spring 30 returns and the swing in the counterclockwise direction is applied to the roller 13 through the arms 17, 18. Due to the swing, the roller 13 is brought into pressure contact with the holding surface 2 of the support table 1. Then, in the state described above, the roller mechanism 10 further moves leftward. This state is shown in FIG. 6.

Figure 7:
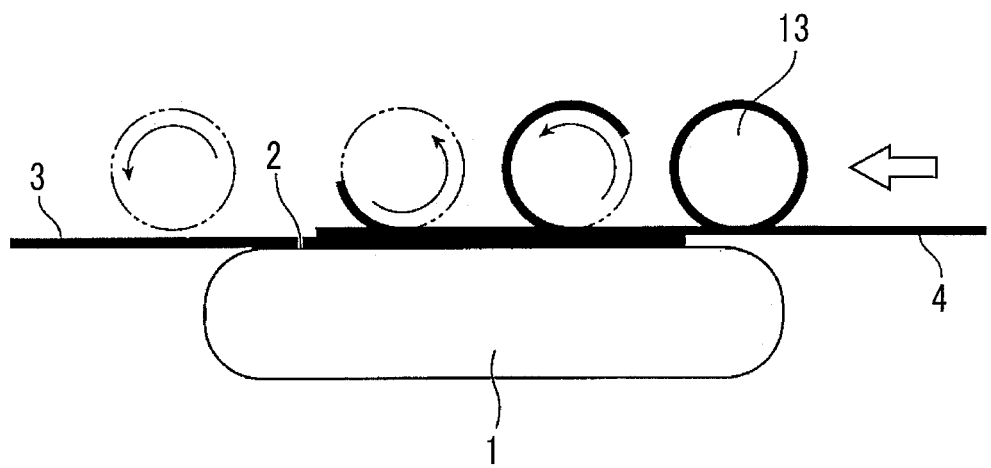
FIG. 7 is a schematic diagram for describing the advantages of the fiber bundle joining apparatus and a fiber bundle joining method.

As described above, in a case where the roller mechanism 10 moves on the holding surface 2 of the support table 1, the roller 13 can freely rotate. For this reason, as schematically shown in FIG. 7, the roller 13 moves on the terminal end portion side of the first fiber bundle 3 placed on the holding surface 2 of the support table 1 while freely rotating in the counterclockwise direction. In the course of the movement, the leading end portion side of the second fiber bundle 4 wound around the roller 13 is unwound onto the terminal end portion side of the first fiber bundle 3. Both the leading end portion side and the terminal end portion side are brought into close contact with each other and pressure-bonded to each other in a state where there is no floating or the like.

The roller mechanism 10, which has released the leading end portion side of the second fiber bundle 4 from the roller 13 while passing over the support table 1, further moves to the second position that is the downstream position. The movement so far is an example of a "second movement of the movement mechanism". Thereafter, the roller mechanism 10 is returned to the first position shown in FIG. 4 again by the movement mechanism 100 and stands by until the next joining.

Figure 8:
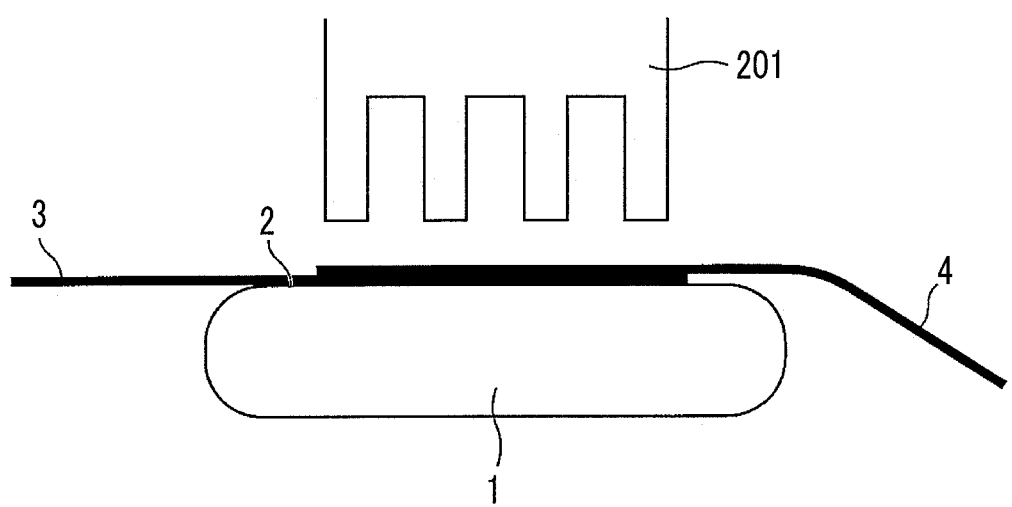
FIG. 8 is a diagram showing a state where stacked fiber bundles are thermocompression-bonded.

After the roller mechanism 10 retreats from the holding surface 2 of the support table 1, as shown in FIG. 8, the thermocompression bonding iron 201 moves down and thermocompression-bonds the terminal end portion side of the first fiber bundle 3 and the leading end portion side of the second fiber bundle 4, which are stacked, and thus both the fiber bundles are joined to and integrated with each other.

As described above, according to the fiber bundle joining apparatus 300 and the fiber bundle joining method for joining the resin-impregnated first fiber bundle 3 and the resin-impregnated second fiber bundle 4, according to the embodiment, the leading end portion side of the second fiber bundle 4 impregnated with resin is wound around the roller 13 more than one turn, whereby it is possible to form a portion where the fiber bundles overlap each other on the peripheral surface of the roller 13. It is possible to stabilize the fixed state of the leading end portion side of the second fiber bundle 4 with respect to the roller 13. The roller 13 that is in the state described above is moved on the terminal end portion side of the preceding first fiber bundle 3 in a state where the rotation thereof is free, whereby a state where the second fiber bundle 4 is directly stacked on the first fiber bundle 3 is created. At that time, the roller 13 is pressed against the first fiber bundle 3 and the second fiber bundle 4 which are stacked. Therefore, the first fiber bundle 3 and the second fiber bundle 4 are accurately positioned and at the same time, misalignment at the time of the joining is also suppressed.

In the embodiment, the support rod 12 is provided in the roller mechanism 10, and the movement mechanism 100 grips the support rod 12 so as to provide a desired movement to the roller mechanism 10. However, the provision of the support rod 12 is one exemplification. Means for allowing the movement mechanism 100 to move the roller mechanism 10 is optional.

In the embodiment described above, the cutout 22 is formed on the side surface 21 on one side of the roller 13. However, a configuration may be made in which a recessed groove is formed parallel to the rotation center axis O2 on the peripheral surface of the roller 13 and a stopper piece having a length that can enter over the entire length of the recessed groove is provided. Even in this form, the intended purpose can be achieved. In this case, the leading end portion side of the second fiber bundle 4 is located at the position of the recessed groove so as to allow the stopper piece to enter the recessed groove. Therefore, it is possible to further stabilize the roller 13 on the leading end portion side of the second fiber bundle 4.

A configuration can also be made in which an appropriate position sensor and actuator are provided and when the position sensor detects the arrival of the roller 13 at the support table 1, the actuator causes the movement of the arms 17, 18 in a direction releasing the engagement between the roller 13 and the stopper piece 40.

The embodiment of the disclosure has been described in detail above. However, the disclosure is not limited to the embodiment described above and various modifications or changes can be made within the scope of the gist of the disclosure stated in the claims.

What is claimed is:

1. A fiber bundle joining apparatus comprising:
   a support table configured to hold a terminal end portion side of a first fiber bundle impregnated with resin;
   a roller mechanism having a roller around which a leading end portion side of a second fiber bundle impregnated with resin is able to be wound;
   a movement mechanism configured to perform a first movement for moving the roller mechanism that is in a state where the leading end portion side of the second fiber bundle is wound around the roller, to a vicinity of the terminal end portion side of the first fiber bundle held on the support table, and a second movement for further moving the roller mechanism on the terminal end portion side of the first fiber bundle after the first movement to create a state where the leading end portion side of the second fiber bundle is stacked on the terminal end portion side of the first fiber bundle; and
   a thermocompression bonding mechanism configured to integrally pressure-bond the terminal end portion side of the first fiber bundle and the leading end portion side of the second fiber bundle stacked on the support table.

2. The fiber bundle joining apparatus according to claim 1, wherein the state where the leading end portion side of the second fiber bundle is wound around the roller is a state where the leading end portion side of the second fiber bundle is wound around the roller more than an amount corresponding to one turn around the roller.

3. The fiber bundle joining apparatus according to claim 1, wherein:
   the roller mechanism includes a rotation restriction mechanism configured to restrict rotation of the roller; and
   the movement mechanism performs the first movement in a state where the rotation is restricted by the rotation restriction mechanism and performs the second movement in a state where the restriction by the rotation restriction mechanism is released.

4. The fiber bundle joining apparatus according to claim 3, wherein:
   the rotation restriction mechanism is a stopper piece;
   the roller has a cutout and an end wall at an end of the cutout; and
   the rotation of the roller is restricted by contact of the stopper piece with the end wall.

5. The fiber bundle joining apparatus according to claim 4, wherein:
   the roller mechanism includes arms and a coil spring;
   the roller is mounted on the arms; and
   the arms are biased by a force of the coil spring so as to rotate about an axis passing through the arms.

* * * * *